J. R. MILLS.
Wheel Hub.

No. 113,441.

Patented April 4, 1871.

WITNESSES:

INVENTOR:
James R. Mills
per
Alexander Mason
atty.

UNITED STATES PATENT OFFICE.

JAMES R. MILLS, OF MACON CITY, MISSOURI.

IMPROVEMENT IN WHEELS FOR VEHICLES.

Specification forming part of Letters Patent No. 113,441, dated April 4, 1871.

*To all whom it may concern:*

Be it known that I, JAMES R. MILLS, of Macon City, in the county of Macon, and in the State of Missouri, have invented certain new and useful Improvements in Wheel for Vehicles; and do hereby declare that the following is a full, clear, and exact description thereof, reference being had to the accompanying drawing, and to the letters of reference marked thereon, making a part of this specification.

The nature of my invention consists in the construction and arrangement of a sectional metallic hub, &c., for wheels, as will be hereinafter more fully set forth.

In order to enable others skilled in the art to which my invention appertains to make and use the same, I will now proceed to describe its construction and operation, referring to the annexed drawing, in which—

Figure 1:
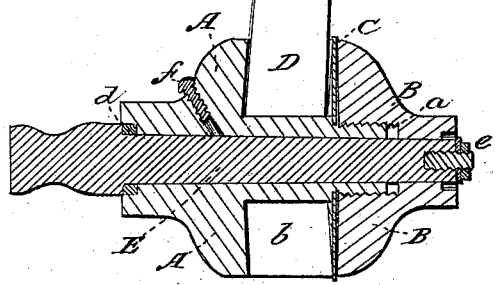
Figure 2:
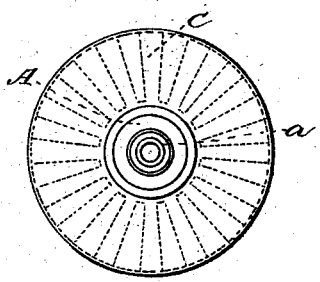
Figure 3:
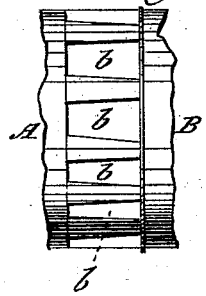

Figure 1 is a longitudinal vertical section of my hub. Fig. 2 is an end view of the rear section, and Fig. 3 is a side view.

My hub is actually a combined box and hub, made in the sections A and B, with a washer, C, between them.

The butt of the rear section, A, and the point of the front section, B, may be made either round or six or eight sided, to hold it in screwing it together with said hub, beaded or ornamented in any desirable way.

The rear section, A, has a screw, *a*, cut on the front end, to receive the front section, B, which has a female screw cut in it, so as to form the burr to fit and screw on the rear section.

In the rear section, A, are cut any desired number of mortises, *b b*, of wedge shape, open in front and on top. These mortises are wide enough on the outside of the section to receive the full side of the spoke, and tapering toward the center, so as to leave a sufficient amount of metal between the spokes to give strength to the partition, and leaving the end of the spoke sit solid on the lower part or bottom of mortise, the spokes having no shoulder resting on the circumference of the hub, as in the common spokes. The back of the mortises *b b* are cut or mortised under toward the butt-end as it approaches the center, so as to give greater length to the mortise lengthwise of the hub at the bottom of the mortise than on the top, so that the spokes will be wider lengthwise of the hub, where they sit on their lower end, than at any other place, thereby holding them firm in their place when screwed up. The mortises are also wider in front than at the back part, as shown in Fig. 3, so that in making the wheel, when the rear section, A, is set on the butt-end and the spokes D D, made in the shape of the mortise and of suitable size, are laid around to their places, with the washer C on top, by screwing the front section to its place the spokes are forced or wedged into the mortises and held there firmly. Then, when the tire is put on, the spokes are forced by it solid or tight onto the center of the hub.

In the butt of the rear section, A, is a recess deep enough to admit a rubber or elastic collar, *d*, with a hole in the center of said collar enough smaller than the size of the spindle E, on which the hub fits or belongs, that the collar or washer, by its elasticity, will adhere to the spindle, and prevent dust from getting in or grease from getting out.

In the front end of the front section, B, is a similar recess, to receive a similar collar or washer for the same purpose. The recess in the butt is deep enough to receive the iron collar on the axle, and the recess in the point is deep enough to receive a part or the whole of the burr *e*, that holds the wheel on the spindle; and the whole length of the hub that goes on the spindle is a little longer, including the elastic washer, than the spindle, so that when the burr is screwed up it will press the rubber washers tight against the hub.

Through the rear section, A, is a hole, with screw *f*, by removing which screw the vehicle can be oiled without taking off the wheel, thereby preventing dust from getting in or grease from getting out.

In case any of the spokes should get broken, by unscrewing the hub they can be removed and new ones put in without taking off the tire; and in case it should be necessary to have a new hub, from wear or any other cause, the old one can be removed from the spokes and a new one put in without removing the tire or the spokes from the fellies of the wheel.

Having thus fully described my invention, what I claim as new, and desire to secure by Letters Patent, is—

The combination of the rear section, A, front section, B, washer C, spokes D, and spindle E with rubber collars $d$, all constructed and arranged substantially as and for the purposes herein set forth.

In testimony that I claim the foregoing I have hereunto set my hand this 6th day of February, 1871.

JAMES R. MILLS.

Witnesses:
A. L. SHORTRIDGE,
R. A. MELONE.